United States Patent [19]
Wilson

[11] 4,068,126
[45] Jan. 10, 1978

[54] FOCUSSED RADIOGRAPHIC CAMERA

[75] Inventor: David T. Wilson, Billerica, Mass.

[73] Assignee: Raytheon Company, Lexington, Mass.

[21] Appl. No.: 743,994

[22] Filed: Nov. 22, 1976

[51] Int. Cl.$^2$ .............................................. G01T 1/20
[52] U.S. Cl. ................................. 250/363 S; 250/368
[58] Field of Search .............................. 250/363 S, 368

[56] References Cited

U.S. PATENT DOCUMENTS

| | | | |
|---|---|---|---|
| 3,769,509 | 10/1973 | Martone et al. | 250/363 S |
| 3,814,938 | 6/1974 | Martone et al. | 250/363 S |
| 3,859,531 | 1/1975 | Van Dijk | 250/363 S X |

Primary Examiner—Davis L. Willis
Attorney, Agent, or Firm—David M. Warren; Milton D. Bartlett; Joseph D. Pannone

[57] ABSTRACT

A radiographic camera of the form employing a scintillator for producing optical photons in response to incident gamma and X-radiation, a collimator positioned between a subject emitting such radiation and the scintillator for guiding the radiation to the scintillator, and a detector of optical photons for signaling the positions of points of impingement of quanta of the incident radiation upon the scintillator to produce an image of the subject, the improvement being a Fresnel focussing means located alongside the scintillator for directing the optical photons to the detector. The Fresnel focussing means takes the form of a segmented mirror at the front surface of the scintillator and a Fresnel lens at the back surface of the scintillator.

10 Claims, 2 Drawing Figures

FOCUSSED RADIOGRAPHIC CAMERA

BACKGROUND OF THE INVENTION

Radiographic cameras such as those disclosed in the U.S. Pat. No. 3,011,057 which issued in the name of H. O. Anger on Nov. 28, 1961, or the U.S. Pat. No. 3,914,611 which issued in the name of K. J. Stout on Oct. 21, 1975, employ a scintillator, a collimator and a detector. The collimator is positioned between a radioactive subject and the scintillator for guiding quanta of radiation towards the scintillator. The scintillator produces optical photons in response to the incident radiation which may be gamma radiation or X-radiation. The detector is responsive to the optical photons for signalling the sites of impingement of quanta of the radiation within the scintillator whereby an image of the radioactive subject is obtained. A construction feature frequently utilized in the building of such radiographic cameras is a mirrored surface applied to the front face of the scintillator, as by silvering the front face, so that optical photons produced by the scintillations and radiated back towards the front face in the direction of the subject are reflected by the mirrored surface away from the subject and towards the detector. The mirrored surface is useful in increasing the intensity of light from the scintillations to produce an optical signal that is more readily detected by the detector.

A problem arises in that radio pharmaceuticals injected into, or ingested by, the subject for producing an image thereof result in greater efficiencies of the scintillator at the higher energies of the foregoing radiation; the higher energy radiation inducing greater numbers of optical photons per quanta of incident radiation than is produced by the lower energy radiation. However, in order to accommodate the higher energy radiation the scintillators are made increasingly thick, the thickest scintillator being utilized with the highest energy radiation in order that the scintillator be able to absorb enough radiation for the scintillations. The scintillations produced by the high energy radiation occur within substantially greater regions from the front face of the scintillator with the result that optical photons of a scintillation which reflect off the mirrored front face of the scintillator travel on paths that are substantially displaced from, and angled to, a direct path of propagation from a site of the scintillation to the detector. As a result, the detector sees an enlarged area from which optical photons appear to be emanating when, in fact, the photons emanate from a substantially smaller region at the site of the scintillation. Furthermore, in the case of gamma radiation propagating along paths inclined relative to the scintillator as occurs with converging, diverging, or pinhole, collimators, the scintillations produced near the front face of the scintillator are laterally displaced relative to scintillations produced near the back face of the scintillator even though all of the scintillations may result from radioactive events at a common point of the subject. The lateral displacement of scintillations blurs the images of points of the subject. Thus, the advantages associated with the high scintillator efficiencies at the higher energies may be outweighed by the disadvantages of a lowered resolution capability of the radiographic camera, the lowered resolution capability being due to the apparent increase in the region from which the optical photons of a scintillation appear to emanate as well as the lateral displacement of scintillations identifying a single point of the subject.

SUMMARY OF THE INVENTION

The foregoing problem is overcome and other advantages are provided by a radiographic camera utilizing a scintillator for producing optical photons in response to incident radiation from a radioactive subject, and a detector of such optical photons, the detector signaling the locations of scintillations on the scintillator to produce an image of a subject emitting the radiation. The scintillator is in the form of a disk with a front surface facing the subject and a rear surface facing the detector. In accordance with the invention, a Fresnel focussing device is optically coupled to the scintillator for directing the optical photons towards the detector.

In a preferred embodiment of the invention, the Fresnel focussing device comprises a mirror support or substrate in the form of a Fresnel lens positioned at the front surface of the scintillator, the convex surfaces of the arcuate segments of the support facing the scintillator and being silvered to provide mirrored arcuate surfaces. The support is fashioned of a material such as glass or aluminum which is transparent to gamma rays, or alternatively, the scintillator crystal itself may be molded to have a front face shaped homothetically to the aforementioned support to provide the mirrored surface. For convenience, the foregoing Fresnel focussing device will be referred to hereinafter as a Fresnel mirror. Both positive and negative Fresnel mirrors may be utilized, the foregoing mirror being a positive mirror for use with a converging collimator, while a negative mirror comprised of concave sections, analogous to a concave lens, is used for a diverging collimator. The segments of the Fresnel mirror are normal to a generating radius of the mirror so that the mirror reflects such ones of the optical photons, as are emitted by a scintillation in a direction generally towards the subject, back through the scintillation towards the detector. In particular, the use of a Fresnel mirror results in the optical photons being reflected back from a virtual focus lying on the path of the gamma ray which produced the aforementioned scintillation rather than from virtual focus lying on a normal to the face of the scintillator as in the case of prior art scintillators having a flat silvered front face. Further improvement is obtained by placing a Fresnel lens at the back surface of the scintillator whereby photons diverging from a site of scintillation and from the aforementioned virtual foci are collimated to impinge upon the detector. The teachings of this invention are applicable to a radiographic camera employing a pinhole collimator as disclosed in the foregoing Anger patent, to a radiographic camera employing a converging collimator or a diverging collimator, or to a radiographic camera in combination with a mask such as that disclosed in the U.S. Pat. No. 3,748,470 which issued in the name of H. H. Barrett on July 24, 1973.

BRIEF DESCRIPTION OF THE DRAWINGS

The aforementioned aspects and other features of the invention are explained in the following description taken in connection with the accompanying drawings wherein.

DESCRIPTION OF THE PREFERRED EMBODIMENT

Figure 1:
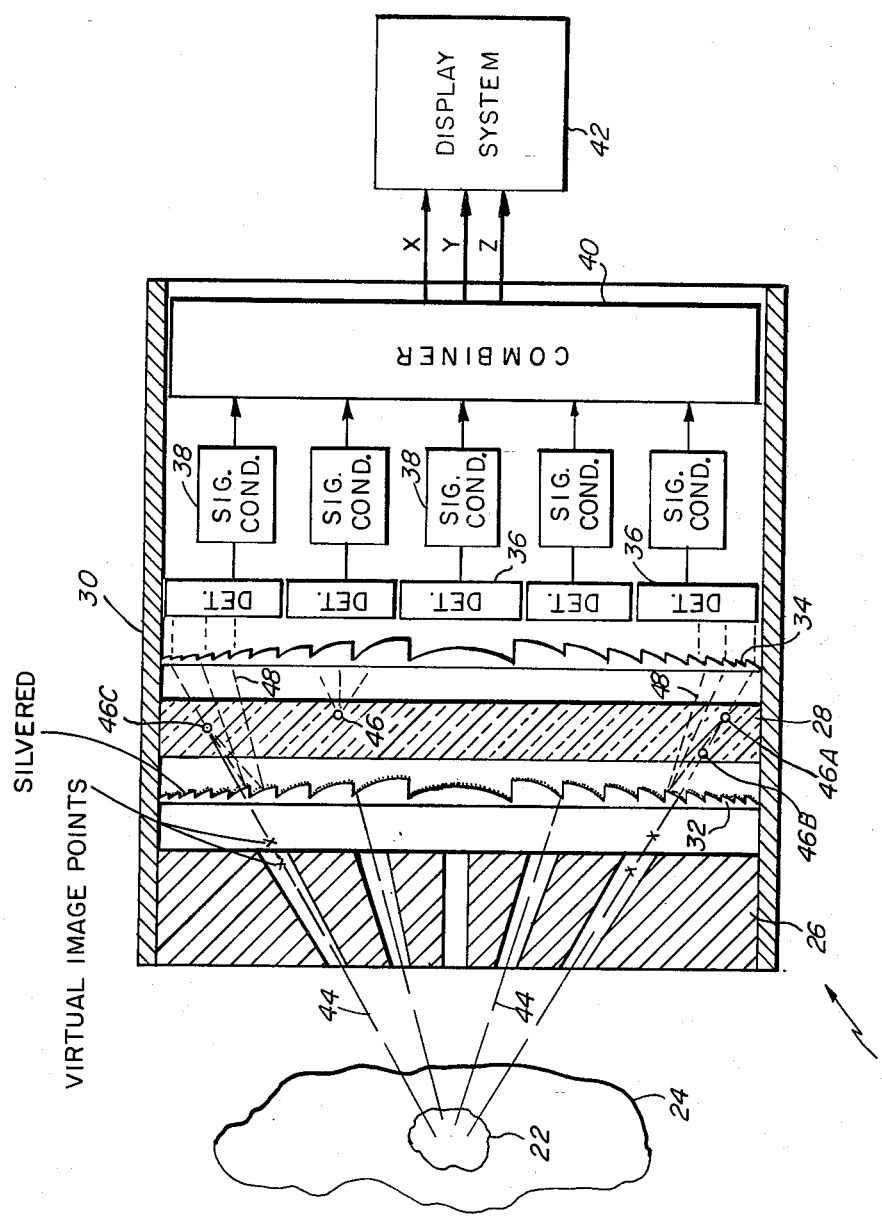
FIG. 1 shows an embodiment of the invention including a Fresnel mirror, a Fresnel lens, and a detector comprising a set of detecting elements positioned to face the back surface of a scintillator.

Referring now to FIG. 1, there is seen an axial sectional view, partially diagrammatic, of a radiographic camera 20 positioned for photographing a region 22 of a subject 24. The camera 20 comprises a converging collimator 26 and a scintillator 28 enclosed within a case 30, the collimator 26 having passageways for conducting high energy photons to the scintillator 28, the passageways converging towards a point behind the region 22. A Fresnel mirror 32 is positioned in front of the scintillator 28 by the case 30, and a Fresnel lens 34 is positioned behind the scintillator 28 by the case 30. The camera 20 includes a detector of optical photons, the detector having the form of a set of detecting elements 36, a plurality of signal conditioning units 38 coupled to corresponding ones of the detecting elements 36, and a combiner 40 which produces X, Y and Z output signals of the camera 20 for a display system 42.

The detecting elements 36 are positioned for viewing the back surface of the scintillator 28, individual ones of the detecting element 36 viewing corresponding portions of the scintillator 28. Each signal conditioning unit 38 transforms a signal produced by the corresponding detecting element 36 to a format suitable for use by the combiner 40. The signal conditioning unit 38 may include an integrator and a pulse shaper as is taught in the aforementioned Stout patent. The combiner 40 includes circuitry such as that disclosed in the aforementioned Stout patent for combining signals of the conditioning unit 38 to produce the X coordinate output signal and the Y coordinate output signal for locating image points to be presented on the display system 42. The Z axis signal produced by the combiner 40 provides data as to the magnitude of the total energy resulting from a scintillation as has been disclosed in the aforementioned Stout patent.

The operation of the Fresnel mirror 32 may be seen in FIG. 1 with reference to the rays 44 or paths of propagation of gamma radiation and the resulting scintillations 46 with their rays 48 of optical photons, two such scintillations being further identified by the legends A and B. With respect to the scintillations 46A-B, it is seen that these scintillations lie on a ray 44 passing along the axis of a passageway of the collimator 26. Due to the convergence of the passageways of the collimator 26 towards the region 22, a magnified view of the region 22 appears upon the scintillator 28. With respect to each of the scintillations 46A-B, it is seen that, while there is only one direction of an incident ray 44, a plurality of rays 48 of optical photons are emitted in a plurality of directions from each of the scintillations 46A-B. The rays 48 directed laterally through the scintillator 28 or at glancing angles to the faces of the scintillator 28 do not reach a detecting element 36. Such ones of the rays 48 as do reach a detecting element 36 are viewed by the detecting element 36 as emanating from the site of a scintillation or from a virtual image thereof, which is located behind the surface of a segment of the mirror 32. As is known from geometrical optics, in the case of a flat mirror, the virtual and true images are equidistant from and located on opposite sides of the mirror surface along a normal thereto. The segments of the mirror 32 have the shapes of a segment of a conical or spherical surface and, as a result of the angled mirror segments, a virtual image point lies at a point on or near the path of an incident ray 44. The segments of the mirror 32 are so oriented that their normals coincide with the axes of the passageways of the collimator 26. Neighboring segments of the mirror 32 are displaced from each other with the result that, as shown in the case of the scintillation 46C, the virtual image point associated with a neighboring segment is displaced from that of the segment intercepted by the ray 44 but still lies approximately on the ray 44. Accordingly, virtual images of the scintillations lie substantially on the axes of the passageway of the collimator 26.

By way of comparison with prior art scintillators wherein the front face is flat and silvered to produce a mirrored surface, rays of optical photons directed obliquely towards the mirrored front face are reflected therefrom to pass through the scintillator at random locations about the scintillation. In contradistinction, the instant invention utilizing the Fresnel mirror 32 provides that rays 48 directed from the scintillations 46A and 46B towards the front face of the scintillator 28 are reflected back by the mirror 32 from the virtual image points lying on the path of the gamma of X-ray 44 which produced the scintillation 46B. Thereby, rays 48 emanating towards the back face and towards the front face of the scintillator 28, are viewed by a detecting element 36 as though they originated from the sites of the scintillations 46A-B or from their colinear virtual image points.

The Fresnel lens 34 still further improves the image as may be seen by considering the camera 20 both with and without the lens 34. In the absence of the lens 34, many of the rays 48 incident upon a detecting element 36 oriented obliquely to the viewing face of the detecting element 36. As is well known, rays of radiation incident obliquely upon the viewing face of a detecting unit such as a photomultiplier induce a smaller output signal from the photomultiplier than a ray of the same photon energy incident in a direction normal to the viewing face of the photomultiplier. Thus, the responsivity of the detecting units 36, in the absense of the lens 34, varies not only with the distance between a scintillation and the detecting unit 36, but also with the angle of incidence of a ray 48 upon the viewing face of the detector element 36.

In accordance with a feature of the invention, the Fresnel lens 34 collimates the rays 48 propagating from the scintillator 28 to the detecting elements 36 such that the rays exiting at oblique angles from the scintillator 28 become parallel rays incident normally upon the viewing faces of the detecting elements 36. Thereby, the variations in intensity of optical photons occur only as a function of the relative distances between the sites of the scintillations and the detecting elements 36, the aforementioned derogation of response of the photomultipliers to oblique incidence being absent in a camera incorporating the Fresnel lens 34.

The use of Fresnel lens 34 in combination with the Fresnel mirror 32 provides a more clearly focussed image for the display system 42 than that of the prior art. The focussing capability of the lens 34 and mirror 32 may be understood as follows. Recalling that the mirror 32 causes the optical photons to appear to emanate from the site of a scintillation or from virtual images on the path of the gamma ray 44 passing through that site, it becomes apparent that rays 48 of optical photons produced by a gamma ray 44 may be regarded, in a simplified model of geometric optics, as coinciding with the gamma ray 44. The geometry of the rays accordingly is independent of the conversion action of the scintillator 28 in converting gamma photons to optical photons. In the case of a diverging collimator (not shown), a negative Fresnel mirror is utilized, the normals to the mirror segments being directed along the passageways of the collimator. Thus, with respect to the ray geometry, the rays 44 may be regarded as being the rays of optical photons, and the focussing of the camera 20 is accomplished by the collimator 26 and the lens 34 as though the mirror 32 and the scintillator 28 were absent. As a result, the camera 20 including the lens 34 is better able to preserve the geometric form of the region 22 as imaged in the display system 42.

Figure 2:
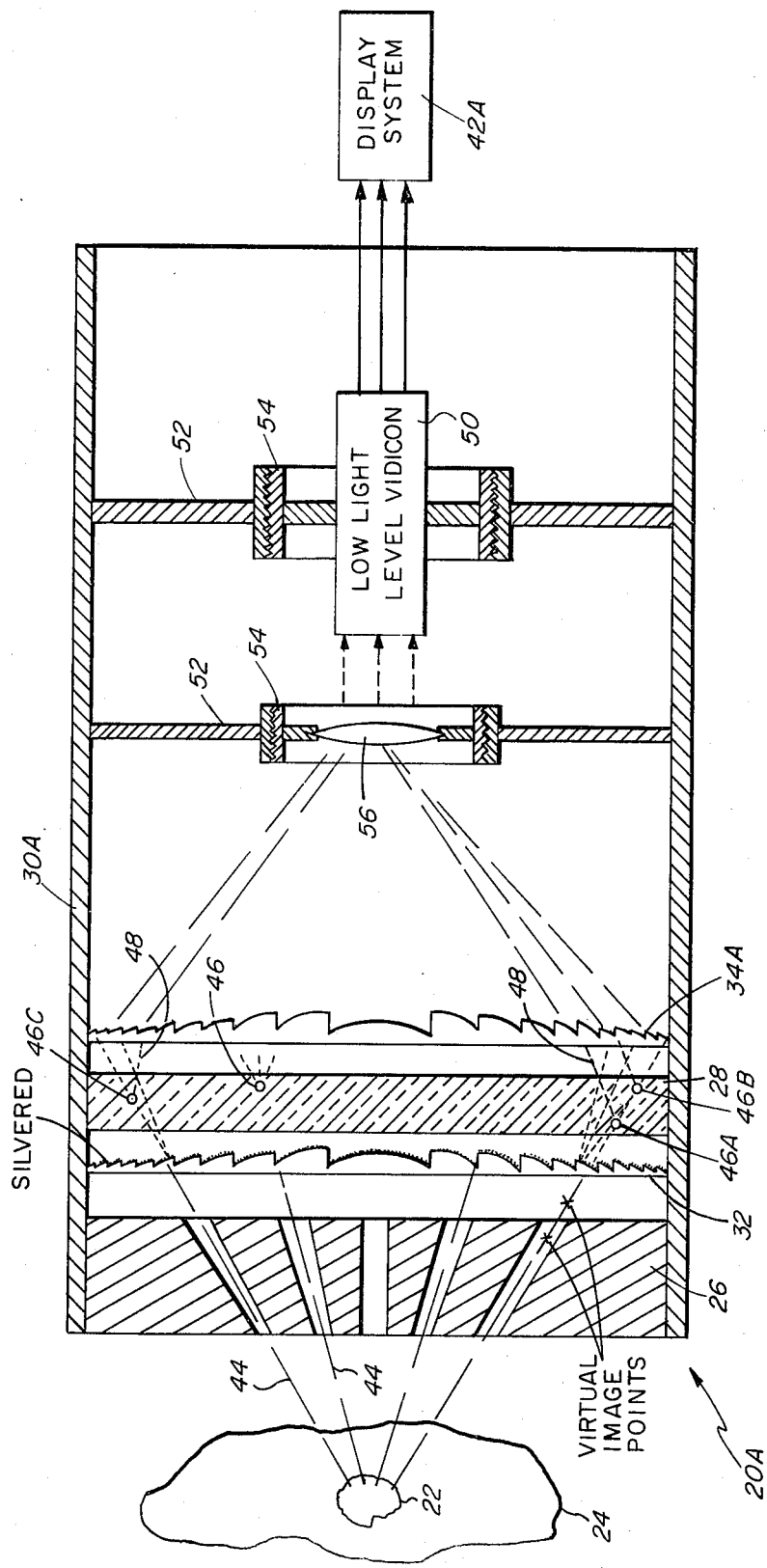
FIG. 2 is an alternative embodiment of a radiographic camera of the invention wherein the set of detectors is replaced by a single detecting element and an imaging lens is placed between a Fresnel lens and the single detecting element.

Referring now to FIG. 2, there is seen an alternative embodiment of the camera, this embodiment of the camera being identified by the legend 20A. The camera 20A differs from an Anger camera in that the set of detecting elements 36 have been replaced by a single detector in the form of a low light level vidicon 50. The vidicon 50 is connected to the case 30A by a supporting strut 52 and a threaded collar 54 whereby a rotation of the collar 54 imparts a displacement along the axes of the vidicon for focussing an image upon the vidicon 50. A lens 56 is similarly supported by a strut 52 and a collar 54, the collar 54 permitting an axial displacement of the lens 56 for the focussing of an image upon the vidicon 50. The Fresnel lens 34 of FIG. 1 has been replaced in FIG. 2 with a Fresnel lens 34A which directs scintillations of the scintillator 28 upon the lens 56 which then images the scintillations upon the vidicon 50. X, Y, and Z output signals of FIG. 1 are coupled to a display system 42A for providing an image of the region 22 of the subject 24. The embodiment of FIG. 2 is advantageous in those situations wherein the television type format of image is desired.

It is understood that the above-described embodiments of the invention are illustrative only and that modifications thereof may occur to those skilled in the art. Accordingly, it is desired that this invention is not to be limited to the embodiments disclosed therein but is to be limited only as defined by the appended claims.

What is claimed is:

1. A radiographic camera comprising:
   a scintillator for producing optical photons in response to incident radiation;
   means for detecting said optical photons, said detecting means signaling the positions of sources of optical photons in said scintillator; and
   reflecting means having a series of reflecting surfaces angled relative to said collimator for directing said optical photons to said detecting means, each of said reflecting surfaces being bounded by concentric arcs.

2. A camera according to claim 1 further comprising focussing means for focussing said optical photons upon said detecting means.

3. A radiographic camera comprising:
   a scintillator for producing optical photons in response to incident radiation;
   means for detecting said optical photons, said detecting means signaling the positions of sources of said optical photons in said scintillator;
   reflecting means having a series of reflecting surfaces angled relative to said collimator for directing said optical photons to said detecting means; and
   lens means for redirecting said optical photons along paths parallel to an axis of said detecting means.

4. A camera according to claim 3 wherein said lens means comprises a Fresnel lens.

5. A radiographic camera comprising:
   a scintillator for producing optical photons in response to incident radiation;
   means for detecting said optical photons, said detecting means signaling the positions of sources of said optical photons in said scintillator;
   reflecting means having a series of reflecting surfaces angled relative to said collimator for directing said optical photons to said detecting means; and
   wherein said reflecting means is positioned alongside a front face of said scintillator with normals to said reflecting surfaces being directed towards a common point.

6. A camera according to claim 5 further comprising focussing means positioned alongside a back face of said scintillator for focussing said optical photons towards said detecting means.

7. A camera according to claim 5 wherein said focussing means comprises a Fresnel lens and an imaging lens.

8. A camera according to claim 5 further comprising a collimator positioned in front of said reflecting means and having passageways directed along said normals.

9. A camera according to claim 8 wherein said reflecting means comprises a substrate in the shape of a Fresnel lens, a surface of said substrate being coated with a reflecting surface.

10. A camera according to claim 9 further comprising lens means including a Fresnel lens positioned behind said scintillator for focussing said optical photons towards said detecting means.

* * * * *